Feb. 10, 1942. V. J. CHAPMAN 2,272,738
CONTACT MECHANISM
Filed Nov. 29, 1940
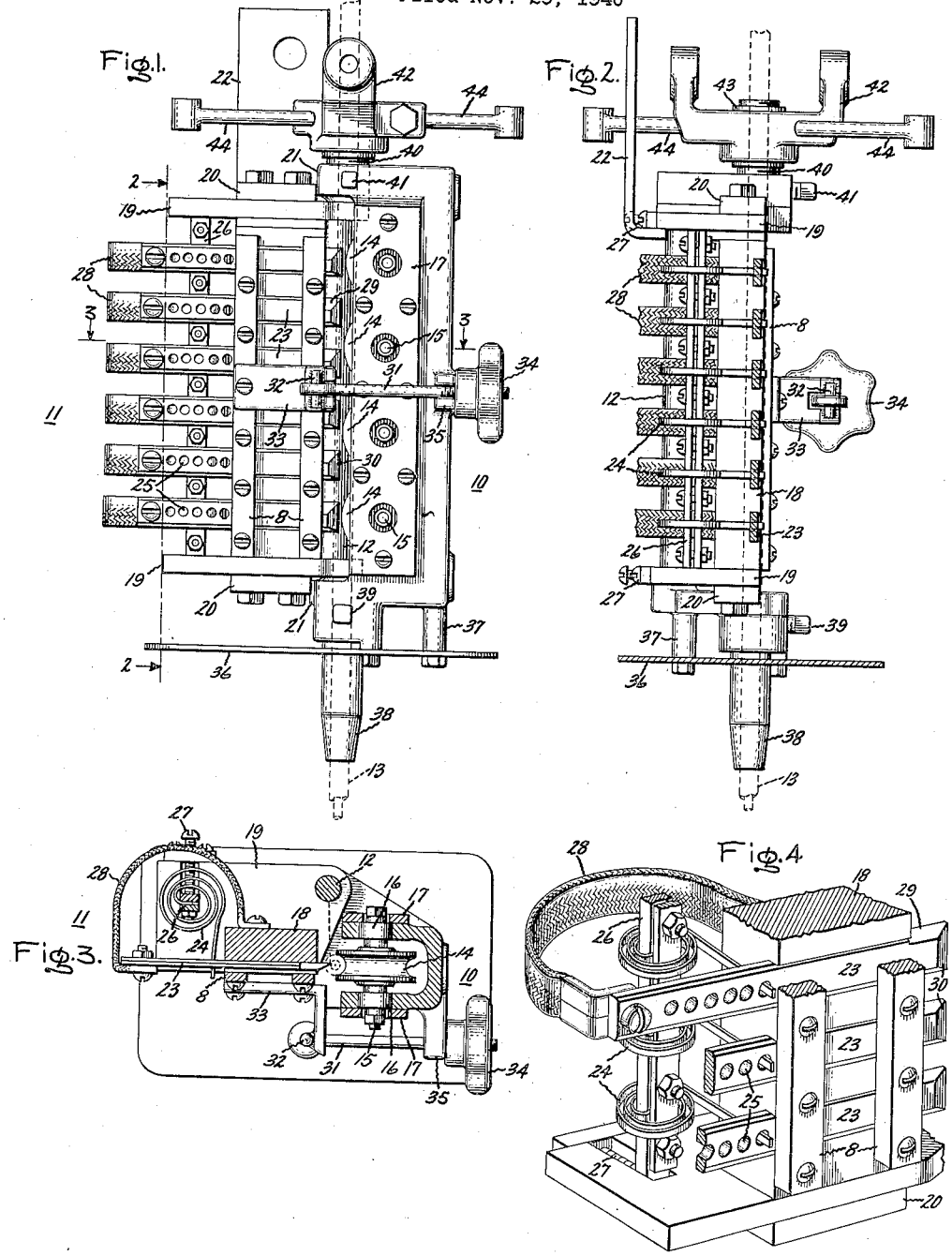
Inventor:
Verni J. Chapman,
by Harry E. Dunham
His Attorney.

Patented Feb. 10, 1942

2,272,738

UNITED STATES PATENT OFFICE 2,272,738

CONTACT MECHANISM

Verni J. Chapman, Schenectady, N. Y., assignor to General Electric Company, a corporation of New York Application November 29, 1940, Serial No. 367,778

4 Claims. (Cl. 219—8)

My invention relates to welding apparatus particularly suited for automatic arc welding with heavy coated electrodes supplied from a continuous coil.

Repetitive welding operations often can be profitably handled with automatic arc welding equipment, especially where the seams are of relatively simple contour such as circles or straight lines. Where the deposited weld metal should be of shielded-arc quality, heavy coated electrodes must be used. The use of heavy coated electrodes necessitates the use of an automatic arc welding head embodying means for feeding the electrode, means for lengthwise slitting its coating and means for supplying welding current to the electrode through the slit in its coating produced by the slitting means.

It is an object of my invention to provide an improved contact mechanism particularly suited for supplying welding current to a heavy coated electrode fed by an arc welding head of the type above identified.

Further objects of my invention will become apparent from a consideration of the following description of one embodiment thereof illustrated in the accompanying drawing.

In this drawing Fig. 1 is a side view of a contact mechanism embodying my invention; Fig. 2 is an end view along the section line 2—2 of Fig. 1; Fig. 3 is a plan view along section line 3—3 of Fig. 1; and Fig. 4 is an enlarged perspective view illustrating more in detail the construction of the contacts, their holder, and the spring tensioning means employed for biasing the contacts into engagement with an electrode.

The contact mechanism illustrated in the drawing may conveniently form a part of an automatic arc welding head such as illustrated and described in my United States Letters Patent 2,250,219, for "Welding apparatus," granted July 22, 1941, and assigned to the assignee of my present invention. The welding head of this copending application illustrates one arrangement embodying means for feeding a heavy coated electrode, means for lengthwise slitting its coating and means embodying my present invention for supplying welding current thereto through the slit produced by the slitting means.

As shown in the drawing, this contact mechanism comprises a main frame 10 and an auxiliary frame 11 hinged to the main frame about a pin 12. The main frame 10 contains a guide for the heavy coated electrode 13. This guide comprises four grooved rolls 14 disposed lengthwise of main frame 10. These guide rolls are supported on axles 15, the ends of which are held in ball bearings 16 located in the flanges of the channel shaped mid-section of main frame 10. These bearings are held in place in frame 10 by cover plate 17.

The auxiliary frame 11 comprises a heavy bronze contact holder 18 which is bolted between end plates 19, one corner of each of which is hinged about pin 12. The bolted assembly includes stops 20 which engage surface stops 21 on main frame 10 and an L-shaped terminal 22 one arm of which is held between the upper end of the contact holder and top end frame 19.

The front face of the contact holder 18 is provided with six rectangular shaped channels which support and guide six electrode engaging contacts 23 slidably held therein by straps 8. Flat guide surfaces of each of the channels in the electrode holder 18 engage corresponding flat surfaces of each contact located therein and serve to guide the contact and direct its beveled end into radial engagement with an electrode in guide 14 of the main frame.

Each contact 23 is biased into engagement with the electrode by a coil spring 24. The outer ends of these springs may be inserted through holes 25, a plurality of which are lengthwise disposed in the end of each contact. This arrangement constitutes a spring tensioning means for the contacts. These springs are spaced according to the spacing of the contacts by a holder 26, the ends of which are adjustably located in slots formed in end plates 19 of auxiliary frame 11. This spring holder may be adjusted toward or away from contact holder 18 through the agency of adjusting screws 27 in order to engage or disengage the spring tensioning means for the contacts. It will be noted that the arrangement is such that when the spring holder 26 is moved away from contact holder 18 to release the spring tensioning means, the free ends of the springs are engaged and aligned by the adjacent edge of contact holder 18. This facilitates re-engaging the spring tensioning means after making an adjustment thereof by repositioning the contacts relative to their holder when the auxiliary frame 11 is swung away from the main frame 10.

Welding current is supplied to the contacts through L-shaped terminal 22 which engages the upper end of contact holder 18. From this holder the current may be supplied directly to the contacts which engage it or through the agency of flexible shunt straps 28, one of which connects the outer end of each of the contacts with its holder.

The electrode engaging end of each contact is beveled at its electrode engaging portion. The leading side of the electrode engaging end of each contact may be beveled to a sharp edge 29 in order to facilitate its entry into the slit formed in the electrode 13 by a coating slitter such as described and illustrated in my above referred to United States Letters Patent. The electrode engaging end portion of each contact has a face at right angles to its edges and sides which is of much less thickness than the thickness of the contact. The end of each contact is beveled as at 30 so that this contact face is positioned at the flat side surface of the contact which engages the bottom of the channel in which it is located. This arrangement guarantees that the electrode engaging face of each contact will be properly aligned by reason of its position in its holder. It also makes it possible to use a much thicker contact and provide for redressing its electrode engaging portion to compensate for wear without spoiling the proper alignment of the contact with the electrode it engages. As shown by the dotted line in Fig. 3, when the main and auxiliary frames 10 and 11 are closed the arrangement is such that the electrode engaging face of each contact makes a tangential engagement with the side of the electrode therewith. The contacts may be made of any material that is wear resistant and also a satisfactory conductor of electric current. For example, they may be made of a copper beryllium alloy such as disclosed in United States Letters Patent No. 1,847,929, Otto Dahl, granted March 1, 1932.

Frame 11 may be held in its closed position against frame 10 through the agency of a latch. This latch comprises a bar 31 having an eye at one end thereof and a threaded portion at its other end. The eye encloses a hinge pin 32 which is mounted on one arm of a bracket 33 whose other arm is attached to the face of contact holder 18. The threaded end of bar 31 is provided with a hand wheel 34 which engages a lug 35 forming part of the main frame 10. In their closed positions frames 10 and 11 are positioned relative to one another by the engagement of stops 20 of frame 11 with stops 21 of frame 10.

A shield 36 is bolted to lugs 37 on the lower end of main frame 10. An electrode guide or nozzle 38 extends through this shield into a socket located in the lower portion of frame 10. A set screw 39 is provided for holding this guide in its socket.

The contact mechanism is supported by an electrode guide 40, one end of which extends into a socket in the upper portion of end frame 10 and is held therein by a set screw 41. Guide 40 is clamped in a yoke 42 and electrically insulated therefrom by a bushing 43. Yoke 42 forms part of a universal joint which permits oscillation of the contact mechanism in either of two directions. The construction of this universal joint is fully described and claimed in my United States Letters Patent No. 2,198,472, granted April 23, 1940, for "Oscillator mechanism." The construction and connection of electrode guide 40 interposed between this universal joint and the main frame of the contact mechanism is described and claimed in my United States Letters Patent No. 2,216,564, granted October 1, 1940, for "Arc welding." Arms 44 forming part of the yoke 42 are provided for the attachment of an oscillating mechanism thereto.

The contact mechanism may be adapted to various sizes of electrodes by substituting suitably sized guide rolls 14 in main frame 10. Nozzle 38 may also be changed in order more accurately to guide the electrode as it leaves the contact mechanism. The heavy bronze housing with which each of the contacts make engagement over a substantial portion of its surface, provides heat conductivity and radiating surface to carry away the heat generated in the contacts. The use of a bronze contact holder also eliminates heating due to hysterisis and eddy currents. Shield 36 also protects the entire assembly from the heat radiated from the arc.

The electrode is most conveniently threaded through the contact mechanism after the auxiliary frame has been swung away from the main frame. This opening of the frames also facilitates readjustment of the spring pressure on each contact. As previously stated, when the spring holder is backed away from the contact holder, the ends of the springs are aligned with the adjacent edge of the contact holder and the contacts may then be positioned in the holder so that when the spring holder is again moved toward the contact holder the several spring ends are simultaneously threaded through the holes in the contacts which are aligned with the edge of the holder against which the spring ends bear. As the contact wears away so that the hole engaged by a spring is less than one-quarter of an inch away from the edge of the contact holder, the spring should be engaged in the next hole. When the auxiliary frame is swung away from the main frame, rapid inspection of the faces of the contacts may be readily made and any tendency of the contacts to stick in their holder becomes evident by the lack of movement of a contact relative to its holder.

While I have shown a particular embodiment of my invention, I do not desire my invention to be limited to the particular construction shown and described, and I intend in the appended claims to cover all modifications within the true spirit and scope of my invention.

What I claim as new and desire to secure by Letters Patent of the United States is:

1. A contact device for connecting a source of welding current to an electrode fed therethrough comprising an electrode guide, a current conducting contact having a flat guiding surface and a beveled end portion forming an electrode engaging contact face of reduced section at one end of said flat guiding surface and a sharp edge extending back from said contact face along one side of said flat guiding surface, a contact holder having a flat guiding surface which engages the flat guiding surface of said contact to direct its electrode engaging contact face in a desired direction into engagement with an electrode in said electrode guide, means for supplying welding current to said contact, and a biasing member acting against said contact to move it relatively to said contact holder and force its electrode engaging contact face into yielding engagement with an electrode in said guide.

2. A contact device for connecting a source of welding current to an electrode fed therethrough comprising a main frame, an electrode guide in said frame, an auxiliary frame, means for releasably holding said frames in a predetermined closed position, a current conducting contact having a plurality of holes spaced lengthwise of one end thereof, a contact holder, means for supplying welding current to said contact, a coil spring, a holder engaging the inner end of said spring, and means for adjusting said spring holder relatively to said contact holder to move the outer end of said spring across the edge of said contact holder into and out of said holes in said contact, the edge of said contact holder constituting means for restraining the outer end of said spring after it has been withdrawn from a hole in said contact.

3. A contact device for connecting a source of welding current to an electrode fed therethrough comprising a main frame, an electrode guide in said frame, an auxiliary frame hinged to said main frame about an axis parallel to the longitudinal axis of an electrode in said guide, means for releasably holding said frames in a predetermined closed position, a plurality of current conducting contacts each of which has a flat guide surface and a beveled electrode engaging edge at one end thereof, a current conducting contact holder located in said auxiliary frame and having a plurality of guide channels spaced lengthwise of said electrode guide, each of said channels having a flat guiding surface which engages the flat guiding surface of one of said contacts located therein to direct its beveled edge into radial engagement with an electrode in said electrode guide when said frames are held in their closed position, means for supplying welding current to said contact holder, flexible shunts connecting each of said contacts with said contact holder, a spring individual to each of said contacts, spring tensioning means connecting each of said springs with its associated contact, a spring holder in said auxiliary frame, means for moving said spring holder relatively to said contact holder to engage or disengage said spring tensioning means, and means for aligning the free ends of said springs when said spring tensioning means has been disengaged by movement of said spring holder.

4. A contact device for connecting a source of welding current to an electrode fed therethrough comprising a main frame, an electrode guide in said frame, an auxiliary frame hinged to said main frame about an axis parallel to the longitudinal axis of an electrode in said guide, means for releasably holding said frames in a predetermined closed position, a plurality of current conducting contacts each of which has a flat guide surface, a beveled electrode engaging edge at one end thereof and a plurality of holes spaced lengthwise thereof in its other end, a current conducting contact holder located in said auxiliary frame and having a plurality of guide channels spaced lengthwise of said electrode guide, each of said channels having a flat guiding surface which engages the flat guiding surface of one of said contacts located therein to direct its beveled edge into radial engagement with an electrode in said electrode guide when said frames are held in their closed position, means for supplying welding current to said contact holder, flexible shunts connecting each of said contacts with said contact holder, a coil spring individual to each of said contacts, a holder engaging the inner ends of said springs and spacing them in said auxiliary frame according to the spacing of said contacts in said contact holder and means for adjusting said spring holder relatively to said contact holder to move the outer ends of said springs across the edge of said contact holder into and out of said holes in said contacts, the edge of said contact holder constituting means for restraining and aligning the outer ends of said springs after they have been withdrawn from the holes in said contacts.

VERNI J. CHAPMAN.